United States Patent
Yamazaki

(10) Patent No.: US 9,049,671 B2
(45) Date of Patent: Jun. 2, 2015

(54) RADIO COMMUNICATION SYSTEM, RADIO BASE STATION, AND POWER CONTROL METHOD

(75) Inventor: Chiharu Yamazaki, Tokyo (JP)

(73) Assignee: KYOCERA Corporation, Kyoto (JP)

( * ) Notice: Subject to any disclaimer, the term of this patent is extended or adjusted under 35 U.S.C. 154(b) by 228 days.

(21) Appl. No.: 13/805,274

(22) PCT Filed: Jun. 15, 2011

(86) PCT No.: PCT/JP2011/063690
§ 371 (c)(1),
(2), (4) Date: Dec. 18, 2012

(87) PCT Pub. No.: WO2011/158858
PCT Pub. Date: Dec. 22, 2011

(65) Prior Publication Data
US 2013/0090147 A1 Apr. 11, 2013

(30) Foreign Application Priority Data

Jun. 18, 2010 (JP) ................................. 2010-140006

(51) Int. Cl.
*H04W 36/00* (2009.01)
*H04B 7/00* (2006.01)
*H04W 52/28* (2009.01)
*H04W 52/02* (2009.01)
(Continued)

(52) U.S. Cl.
CPC ........ *H04W 52/283* (2013.01); *H04W 52/0225* (2013.01); *H04W 52/0206* (2013.01); *H04W 16/08* (2013.01); *H04W 92/20* (2013.01); *Y02B 60/50* (2013.01)

(58) Field of Classification Search
USPC ................. 455/436, 443, 453, 572, 574, 522, 455/68–70; 370/311, 328, 331, 332, 318
See application file for complete search history.

(56) References Cited

U.S. PATENT DOCUMENTS

| | | | |
|---|---|---|---|
| 6,584,330 B1 * | 6/2003 | Ruuska | 455/574 |
| 8,010,117 B1 * | 8/2011 | Sigg et al. | 455/446 |
| 8,494,595 B2 * | 7/2013 | Yoshiuchi et al. | 455/574 |

(Continued)

FOREIGN PATENT DOCUMENTS

| | | | |
|---|---|---|---|
| EP | 2056628 A1 | 5/2009 | |
| EP | 2141947 A1 | 1/2010 | |

(Continued)

OTHER PUBLICATIONS

An Office Action; "Notice of Reason for Rejection," issued by the Japanese Patent Office on Feb. 4, 2014, which corresponds to Japanese Patent Application No. 2010-140006 and is related to U.S. Appl. No. 13/805,274; with English language statement of relevance.

(Continued)

*Primary Examiner* — Dominic E Rego
(74) *Attorney, Agent, or Firm* — Studebaker & Brackett PC

(57) ABSTRACT

Wireless base station eNB10-1 detects the number of wireless terminals in the area of overlap between cell C20-1, which is formed by base station eNB10-1 (itself), and cell C20-2, which is formed by wireless base station eNB10-2. Additionally, in accordance with the number of wireless terminals in the overlapping area, wireless base station eNB10-1 controls the power supplies of wireless base station eNB10-1 and wireless base station eNB10-2.

6 Claims, 6 Drawing Sheets

(51) Int. Cl.
*H04W 16/08* (2009.01)
*H04W 92/20* (2009.01)

(56) References Cited

U.S. PATENT DOCUMENTS

| | | | |
|---|---|---|---|
| 2004/0117432 A1 | 6/2004 | Kitami et al. | |
| 2010/0246462 A1* | 9/2010 | Lindgren et al. | 370/311 |
| 2013/0012257 A1* | 1/2013 | Kimura et al. | 455/522 |

FOREIGN PATENT DOCUMENTS

| | | | |
|---|---|---|---|
| JP | 2002-185458 A | 6/2002 | |
| JP | 2002-204478 A | 7/2002 | |
| JP | 2003-032264 A | 1/2003 | |
| JP | 2004-186750 A | 7/2004 | |
| JP | 2004-187242 A | 7/2004 | |
| JP | 2004-201006 A | 7/2004 | |
| JP | 2005-033389 A | 2/2005 | |

OTHER PUBLICATIONS

International Search Report; PCT/JP2011/063690; Aug. 30, 2011; with translation.

3GPP TR 36.902 V9.1.0 (Mar. 2010); 3rd Generation Partnership Project; Technical Specification Group Radio Access Network; Evolved Universal Terrestrial Radio Access Network (E-UTRAN); Self-configuring and self-optimizing network (SON) use cases and solutions (Release 9); pp. 1-23.

The extended European search report and a written opinion issued by the European Patent Office on Aug. 1, 2014, which corresponds to European Patent Application No. 11795762.1-1855 and is related to U.S. Appl. No. 13/805,274.

"3rd Generation Partnership Project; Technical Specification Group Services and System Aspects; Telecommunication management; Study on Energy Saving Management (ESM) (Release 10)"; 3GPP Standard; 3GPP TR 32.826; Mar. 2010; pp. 1-33; V10.0.0; 3rd Generation Partnership Project (3GPP).

Huawei et al.; "Energy Saving in UTRAN"; 3GPP TSG-RAN WG3 #65bis; Oct. 12-15, 2009; pp. 1-3; R3-092342; 3rd Generation Partnership Project (3GPP); Miyazaki, Japan.

* cited by examiner

RADIO COMMUNICATION SYSTEM, RADIO BASE STATION, AND POWER CONTROL METHOD

TECHNICAL FIELD

The present invention relates to a radio communication technology, and more particularly, relates to a radio communication system, a radio base station, and a power control method, employing SON.

BACKGROUND ART

In an LTE (Long Term Evolution) being standardized in 3GPP (3rd Generation Partnership Project) which is a group aiming to standardize a radio communication system, a technology called SON (Self Organizing Network) is employed. According to the SON, it is expected to automatize the installation or maintenance of a radio base station, which does not require a field measurement or setting by personnel (for example, refer to Non Patent Literature 1).

In the SON, there has been proposed a technique of suppressing power consumption by controlling on/off of power of a radio base station (called "eNB" in the 3GPP). Such a technique is termed "Energy Savings". In the energy savings, when the power of the radio base station eNB is turned on, the radio base station eNB notifies other radio base station eNB that the power of the radio base station eNB is turned on. Furthermore, when turning on the power of other radio base station eNB, the radio base station eNB notifies the other radio base station eNB that the power of the other radio base station eNB is turned on.

However, the aforementioned energy savings technique does not consider a case in which cells of two radio base stations eNB overlap each other, and thus, efficient power control is not possible.

CITATION LIST

Non-Patent Literature

[Non-Patent Literature 1] 3GPP TR 36.902 V9.1.0 March, 2010.

SUMMARY OF INVENTION

A radio communication system according to a first feature includes a first radio communication unit and a second radio communication unit, which have communication areas overlapping each other and have different numbers of radio terminals to be accommodated. The radio communication system comprises: a control unit that controls power of the first radio communication unit and power of the second radio communication unit. The control unit performs control for turning on or off the power of the first radio communication unit and the power of the second radio communication unit on the basis of a number of radio terminals in an overlapping area corresponding to a range in which the communication areas overlap each other.

According to the above feature, the control unit is able to turn on or off the power of the first radio communication unit and the power of the second radio communication unit in accordance with the number of radio terminals in an overlapping area. Consequently, when a radio communication unit in which the power is turned on is appropriately selected in accordance with the number of the radio terminals in the overlapping area, efficient power control of a radio base station is enabled because it is possible to suppress power consumption of a radio communication system.

In the first feature, the control unit performs control for turning on only the power of the first radio communication unit when the number of radio terminals in the overlapping area is smaller than a first threshold value, and turning on only the power of the second radio communication unit when the number of radio terminals in the overlapping area is equal to or more than the first threshold value and is smaller than a second threshold value in a case where the number of radio terminals that can be accommodated by the first radio communication unit is smaller than the number of radio terminals that can be accommodated by the second radio communication unit, In the first feature, frequencies of the first radio communication unit and the second radio communication unit, which are used for radio communication with the radio terminals, are different from each other. The control unit performs control for turning on the power of the first radio communication unit and turning on the power of the second radio communication unit, when the number of radio terminals in the overlapping area is equal to or more than the second threshold value.

In the first feature, the control unit transmits coordination information, which indicates that the first radio communication unit and the second radio communication unit coordinate with each other in relation to power control, to other radio communication unit.

A radio base station according to a second feature has a communication area overlapping a communication area of other radio base station and has a number of radio terminals to be accommodated different from a number of radio terminals to be accommodated of the other radio base station. The radio base station comprises: a control unit configured to control power of the radio base station. The control unit performs control for turning on or off the power on the basis of a number of radio terminals in an overlapping area corresponding to a range in which the communication areas overlap each other.

A power control method according to a third feature is used in a radio communication system including a first radio communication unit, a second radio communication unit, and a control unit, the first radio communication unit and the second radio communication unit having communication areas overlapping each other and having different numbers of radio terminals to be accommodated. The power control method comprising the steps of: controlling, by the control unit, power of the first radio communication unit and power of the second radio communication unit. In the step of controlling the power, the power of the first radio communication unit and the power of the second radio communication unit are controlled to be turned on or off on the basis of a number of radio terminals in an overlapping area corresponding to a range in which the communication areas overlap each other.

DESCRIPTION OF EMBODIMENTS

Figure 1:
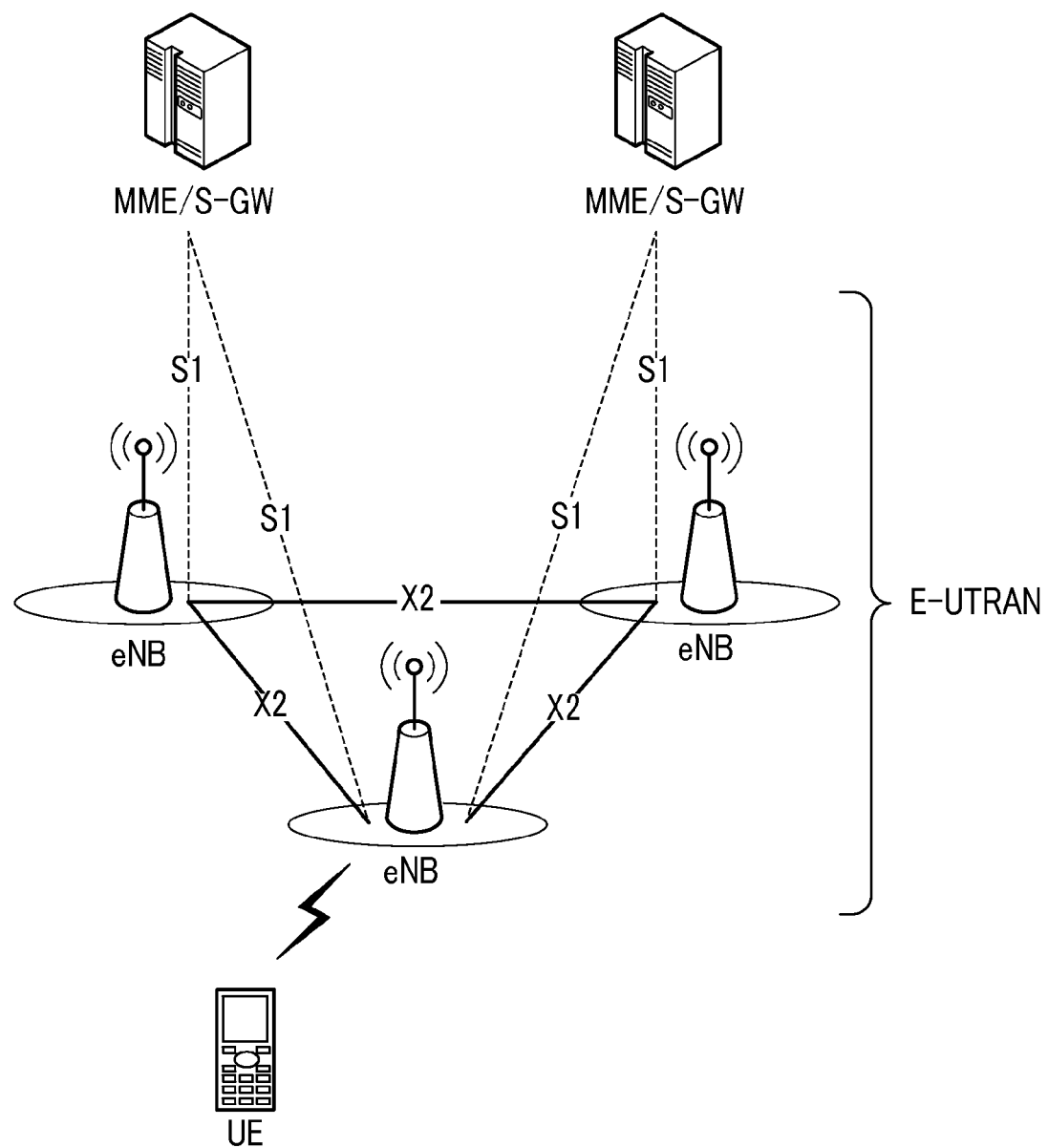
FIG. 1 is a diagram for explaining the overview of an LTE system.

Next, an embodiment of the present invention will be described with reference to the drawings. Specifically, (1) Overview of LTE system, (2) Configuration of radio communication system, (3) Configuration of radio base station, (4) Operation of radio communication system, (5) Operation and effect, and (6) Other embodiments will be described. It is to be noted that the same or similar reference numerals are applied to the same or similar parts through the drawings in the following embodiments.

(1) Overview of LTE System

FIG. 1 is a diagram for explaining the overview of an LTE system. As illustrated in FIG. 1, a plurality of radio base stations eNB constitute E-UTRAN (Evolved-UMTS Terrestrial Radio Access Network). Each of the plurality of radio base stations eNB forms a cell that is a communication area where a service should be provided to a radio terminal UE.

The radio terminal UE is a radio communication device which the user has, and it is also called as "User Equipment". The radio terminal UE measures quality (that is, radio quality) of a radio signal received from a radio base station eNB, and transmits a report (hereinafter, a measurement result report) of a measurement result of the radio quality to a radio base station eNB to which the radio terminal UE is connected.

Such radio quality includes reference signal received power (RSRP), signal-to-interference noise ratio (SINR) and the like. The measurement result report related to the RSRP is called a measurement report, and the measurement result report related to an index of the SINR is called CQI (Channel Quality Indicator).

Furthermore, the radio base station eNB, to which the radio terminal UE is connected, performs handover control for switching destinations to which the radio terminal UE is connected, on the basis of the measurement report received from the radio terminal UE. When the radio terminal UE receives a reference signal from a plurality of radio base stations eNB, the measurement report includes a plurality of RSRPs corresponding to the plurality of radio base stations eNB. Normally, the radio base station eNB, to which the radio terminal UE is connected, selects a radio base station eNB with the highest RSRP of the plurality of radio base stations eNB as a new destination to which the radio terminal UE is connected.

Furthermore, the radio base station eNB, to which the radio terminal UE is connected, assigns a resource block, which is an assignment unit of a radio resource, to the radio terminal UE on the basis of the CQI received from the radio terminal UE.

The radio base stations eNB are capable of communicating with one another through an X2 interface which is a logical communication path through which it is possible to communicate among base stations. Each of the plurality of radio base stations eNB can communicate with EPC (Evolved Packet Core), more specifically, with MME (Mobility Management Entity)/S-GW (Serving Gateway) via an S1 interface.

(2) Configuration of Radio Communication system

Figure 2:
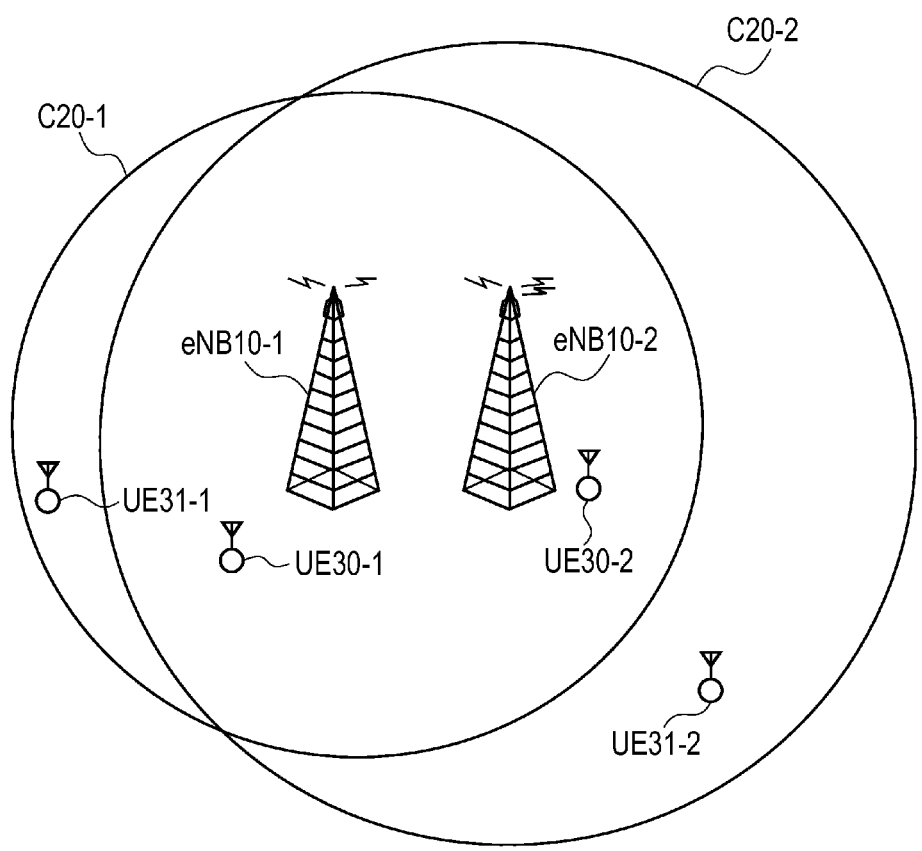
FIG. 2 is a schematic configuration diagram of a radio communication system according to an embodiment of the present invention.

As illustrated in FIG. 2, a radio communication system 1 includes a radio base station eNB10-1 forming a cell C20-1 and a radio base station eNB10-2 forming a cell C20-2. The radio base station eNB10-1 and the radio base station eNB10-2 are adjacent to each other, and there exists an area (an overlapping area) where the cell C20-1 and the cell C20-2 overlap each other. An area of the cell C20-1 is smaller than that of the cell C20-2. Furthermore, most (an area of 80% or more of the whole cell C20-1) of the area of the cell C20-1 overlaps the cell C20-2.

Furthermore, the radio communication system 1 includes a radio terminal UE30-1 and a radio terminal UE30-2 in the overlapping area of the cell C20-1 and the cell C20-2, a radio terminal UE31-1 in the cell C20-1, and a radio terminal UE31-2 in the cell C20-2.

The radio base station eNB10-1 and the radio base station eNB10-2 are capable of communication to each other by using the aforementioned X2 interface.

Hereinafter, it is assumed that the number of radio terminals that can be accommodated by the radio base station eNB10-1 is smaller than the number of radio terminals that can be accommodated by the radio base station eNB10-2, and power consumption of the radio base station eNB10-1 that can accommodate a small number of radio terminals is smaller than power consumption of the radio base station eNB10-1 that can accommodate a large number of radio terminals. Furthermore, the number of the radio terminals to be accommodated indicates the number of radio terminals with which the radio base station eNB is able to simultaneously perform radio communication.

Furthermore, it is assumed that the radio base station eNB10-1 and the radio base station eNB10-2 are initially powered on, the radio base station eNB10-1 performs radio communication with the radio terminal UE30-1 and the radio terminal UE31-1 in the cell C20-1, and the radio base station eNB10-2 performs radio communication with the radio terminal UE30-2 and the radio terminal UE31-2 in the cell C20-2.

Furthermore, it is assumed that a frequency used by the radio base station eNB10-1 when performing radio communication with the radio terminal UE30-1 and the radio terminal UE31-1 is different from a frequency used by the radio base station eNB10-2 when performing radio communication with the radio terminal UE30-2 and the radio terminal UE31-2.

In addition, FIG. 2 illustrates only one radio terminal UE30-1, only one radio terminal UE30-2, only radio terminal UE31-1, and only one radio terminal UE31-2. However, it is assumed that there actually exist a plurality of radio terminals UE30-1, a plurality of radio terminals UE30-2, a plurality of radio terminals UE31-1, and a plurality of radio terminals UE31-2. In the present embodiment, the radio base station eNB10-1 corresponds to a first radio communication unit and the radio base station eNB10-2 corresponds to a second radio communication unit.

(3) Configuration of Radio Base Station

Figure 3:
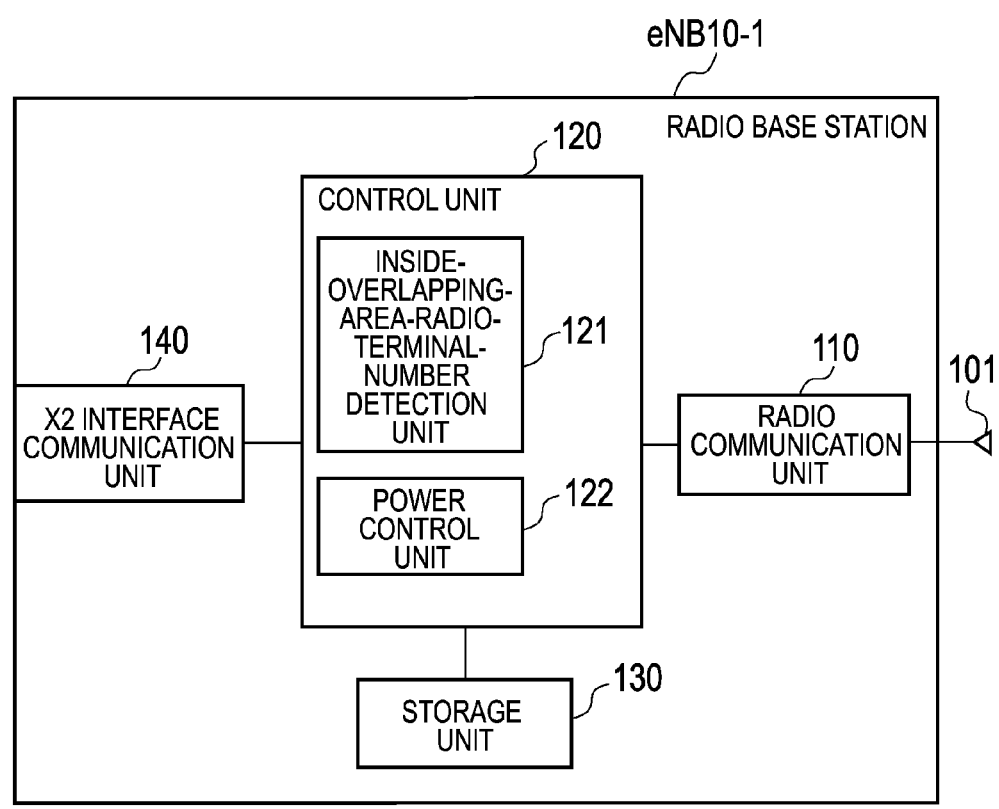
FIG. 3 is a block diagram illustrating a configuration of a radio base station according to the embodiment of the present invention.

Next, the configuration of the radio base station eNB10-1 will be described. FIG. 3 is a block diagram illustrating the configuration of the radio base station eNB10-1 according to the present embodiment. In addition, the radio base station eNB10-2 also has the same configuration as that of the radio base station eNB10-1.

As illustrated in FIG. 3, the radio base station eNB10-1 includes an antenna 101, a radio communication unit 110, a control unit 120, a storage unit 130, and an X2 interface communication unit 140.

The antenna 101 is used for transmitting and receiving a radio signal. The radio communication unit 110 includes, for example, a radio frequency (RF) circuit and a baseband (BB) circuit, and transmits/receives a radio signal to/from the radio terminal UE30-1 or the radio terminal UE31-1 through the antenna 101. Furthermore, the radio communication unit 110 modulates a transmission signal and demodulates a reception signal.

The control unit 120 is configured by a CPU, for example, and controls various functions provided in the radio base station eNB10-1. The storage unit 130 is configured by a memory, for example, and stores various types of information used for the control and the like of the radio base station eNB10-1. The X2 interface communication unit 140 communicates with the radio base station eNB10-2, that is, communicates between the radio base stations, by using the X2 interface.

The control unit 120 includes an inside-overlapping-area-radio-terminal-number detection unit 121, and a power control unit 122.

The inside-overlapping-area-radio-terminal-number detection unit 121 receives measurement reports, which are transmitted from the radio terminal UE30-1 and the radio terminal UE30-2 connected to the radio base station eNB10-1, through the antenna 101 and the radio communication unit 110.

Based on the measurement reports, the inside-overlapping-area-radio-terminal-number detection unit 121 detects the number of (hereinafter, referred to as "the number of connected terminals in the overlapping area of its own station") radio terminals UE (here, the radio terminals UE30-1) that are connected to the radio base station eNB10-1 and exist in the overlapping area. Specifically, the inside-overlapping-area-radio-terminal-number detection unit 121 extracts reference signal received power (RSRP) from the radio base station eNB10-2 among reference signal received powers (RSRP) included in measurement reports from the radio terminals UE30-1 and the radio terminals UE30-2. Moreover, when the reference signal received power (RSRP) from the radio base station eNB10-2 is equal to or more than a predetermined value, the inside-overlapping-area-radio-terminal-number detection unit 121 designates radio terminals from which the corresponding measurement reports are transmitted as the radio terminals UE30-1 that are connected to the radio base station eNB10-1 and exists in the overlapping area, and calculates the number of the radio terminals UE30-1 as the number of the connected terminals in the overlapping area of its own station. Furthermore, the predetermined value, for example, indicates the reference signal received power (RSRP) from the radio base station eNB10-2, which is assumed in an outer edge of the cell C20-2.

The inside-overlapping-area-radio-terminal-number detection unit 121 transmits a message (hereinafter, referred to as an information message for requesting the number of connected terminals in the overlapping area of other station) for requesting the number (hereinafter, referred to as the number of the connected terminals in the overlapping area of other station) of radio terminals UE (here, the radio terminals UE30-2), which are connected to the radio base station eNB10-2 and exist in the overlapping area, to the radio base station eNB10-2 through the X2 interface communication unit 140.

In the radio base station eNB10-2 that received the information message for requesting the number of the connected terminals in the overlapping area of other station, the inside-overlapping-area-radio-terminal-number detection unit 121 detects the number (the number of the connected terminals in the overlapping area of other station) of the radio terminals UE30-2, which are connected to the radio base station eNB10-2 and exist in the overlapping area, based on measurement reports, similarly to the aforementioned inside-overlapping-area-radio-terminal-number detection unit 121 of the radio base station eNB10-1. Moreover, the inside-overlapping-area-radio-terminal-number detection unit 121 of the radio base station eNB10-2 transmits an information message of the number of the connected terminals in the overlapping area of other station to the radio base station eNB10-1.

The inside-overlapping-area-radio-terminal-number detection unit 121 of the radio base station eNB10-1 receives the information message of the number of the terminals connected in the overlapping area of other station from the radio base station eNB10-2 through the X2 interface communication unit 140. Next, the inside-overlapping-area-radio-terminal-number detection unit 121 adds the number of the terminals connected in the overlapping area of its own station to the number of the terminals connected in the overlapping area of other station, and detects the number of radio terminals (here, the radio terminals UE30-1 and the radio terminals UE30-2) in the overlapping area.

The power control unit 122 controls the power of its own radio base station eNB10-1 and the power of other radio base station eNB10-2 according to the number of the radio terminals in the overlapping area.

Specifically, the storage unit 130 stores threshold values (a first threshold value and a second threshold value) of the number of the radio terminals in the overlapping area used in the determination of power control. Furthermore, the first threshold value is smaller than the maximum number of radio terminals UE that can be accommodated by the radio base station eNB10-1. The second threshold value is larger than the first threshold value, and is smaller than the maximum number of the radio terminals UE that can be accommodated by the radio base station eNB10-1.

The power control unit 122 performs the following first to third processes according to a result obtained by comparing the number of the radio terminals in the overlapping area with the first threshold value and the second threshold value.

(First process) When the number of radio terminals in the overlapping area is smaller than the first threshold value, the power control unit 122 determines to turn on the power of the radio base station eNB10-1 and turn off the power of the radio base station eNB10-2. In this case, the power control unit 122 maintains the power-on of its own radio base station eNB10-1. Furthermore, the power control unit 122 transmits a power-off request information message for requesting power-off to the radio base station eNB10-2 through the X2 interface communication unit 140.

When the power-off request information message is received, a power control unit 122 of the radio base station eNB10-2 performs control for turning off the power of the radio base station eNB10-2 in response to the power-off request information message. In addition, preferably, the power control unit 122 of the radio base station eNB10-2 gradually reduces transmission power, thereby ensuring a time margin in which the connected radio terminal UE30-2 is handed over to the radio base station eNB10-1, and a time margin in which the connected radio terminal UE31-2 is handed over to other radio base station eNB (not illustrated).

(Second process) When the number of the radio terminals in the overlapping area is equal to or more than the first threshold value and smaller than the second threshold value, the power control unit 122 determines to turn off the power of the radio base station eNB10-1 and turn on the power of the radio base station eNB10-2. In this case, the power control unit 122 performs control for turning off the power of its own radio base station eNB10-1. In addition, preferably, the power control unit 122 gradually reduces transmission power, thereby ensuring a time margin in which the connected radio terminal UE30-1 is handed over to the radio base station eNB10-2, and a time margin in which the connected radio terminal UE31-1 is handed over to other radio base station eNB (not illustrated).

Furthermore, the power control unit 122 transmits a power-on request information message for requesting power-on to the radio base station eNB10-2 through the X2 interface communication unit 140.

When the power-on request information message is received, the power control unit 122 of the radio base station eNB10-2 maintains the power-on of the radio base station eNB10-2 in response to the power-on request information message.

(Third process) When the number of the radio terminals in the overlapping area is equal to or more than the second threshold value, the power control unit 122 determines to turn on the power of the radio base station eNB10-1 and turn on the power of the radio base station eNB10-2. In this case, the power control unit 122 maintains the power-on of its own radio base station eNB10-1. Furthermore, the power control unit 122 transmits a power-on request information message for requesting power-on to the radio base station eNB10-2 through the X2 interface communication unit 140.

When the power-on request information message is received, the power control unit 122 of the radio base station eNB10-2 maintains the power-on of the radio base station eNB10-2 in response to the power-on request information message.

Furthermore, along with the above-described power control, the power control unit 122 transmits a message of information (coordination information), which indicates that the radio base station eNB10-1 and the radio base station eNB10-2 coordinate with each other in relation to the aforementioned power control, to other radio base station eNB (not illustrated) through the X2 interface communication unit 140. The coordination information message includes information, which indicates that the message is coordination information, a cell ID that is identification information of the radio base station eNB10-1, and a cell ID that is identification information of the radio base station eNB10-2.

(4) Operation of Radio Communication System

Figure 4:
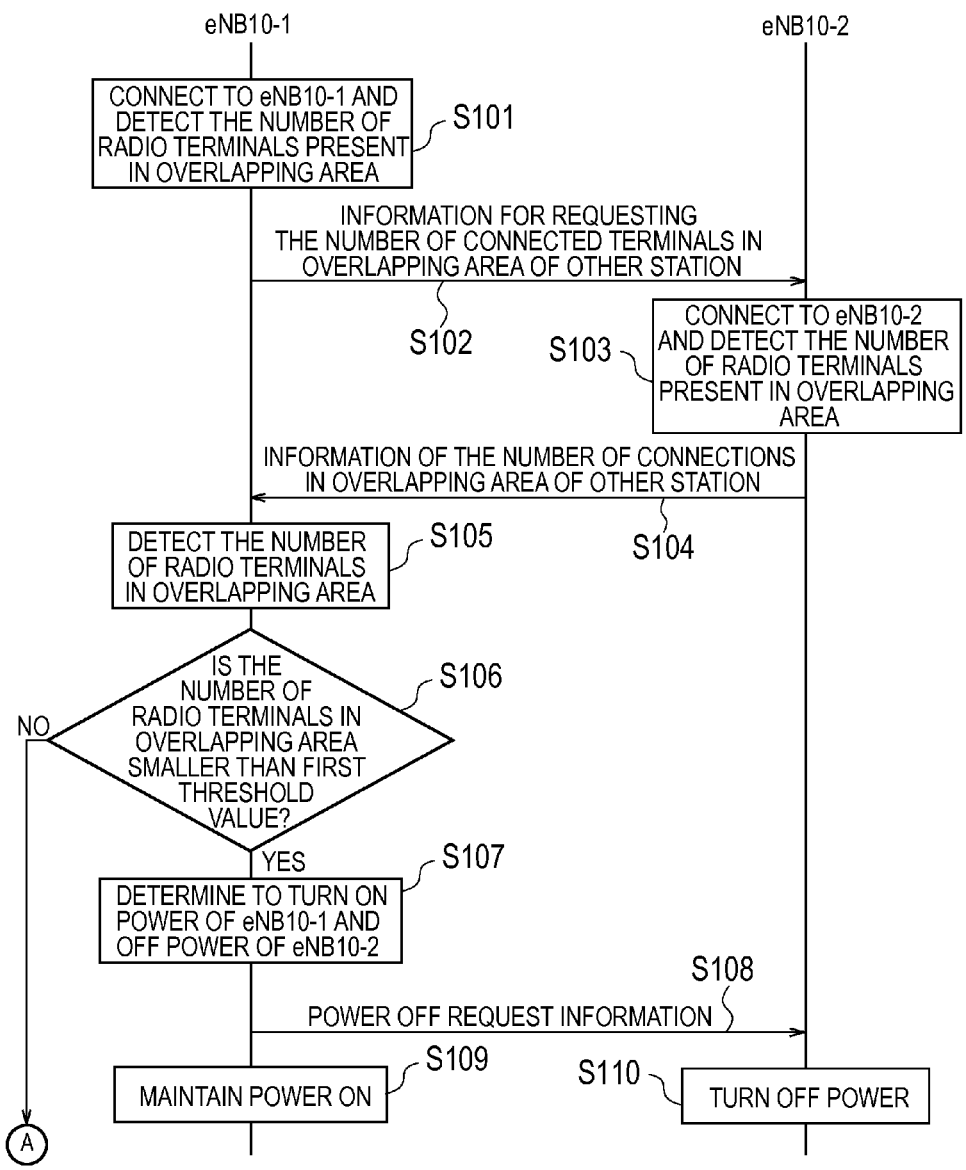
FIG. 4 is an operation sequence diagram illustrating a first operation of the radio communication system according to the embodiment of the present invention.
Figure 5:
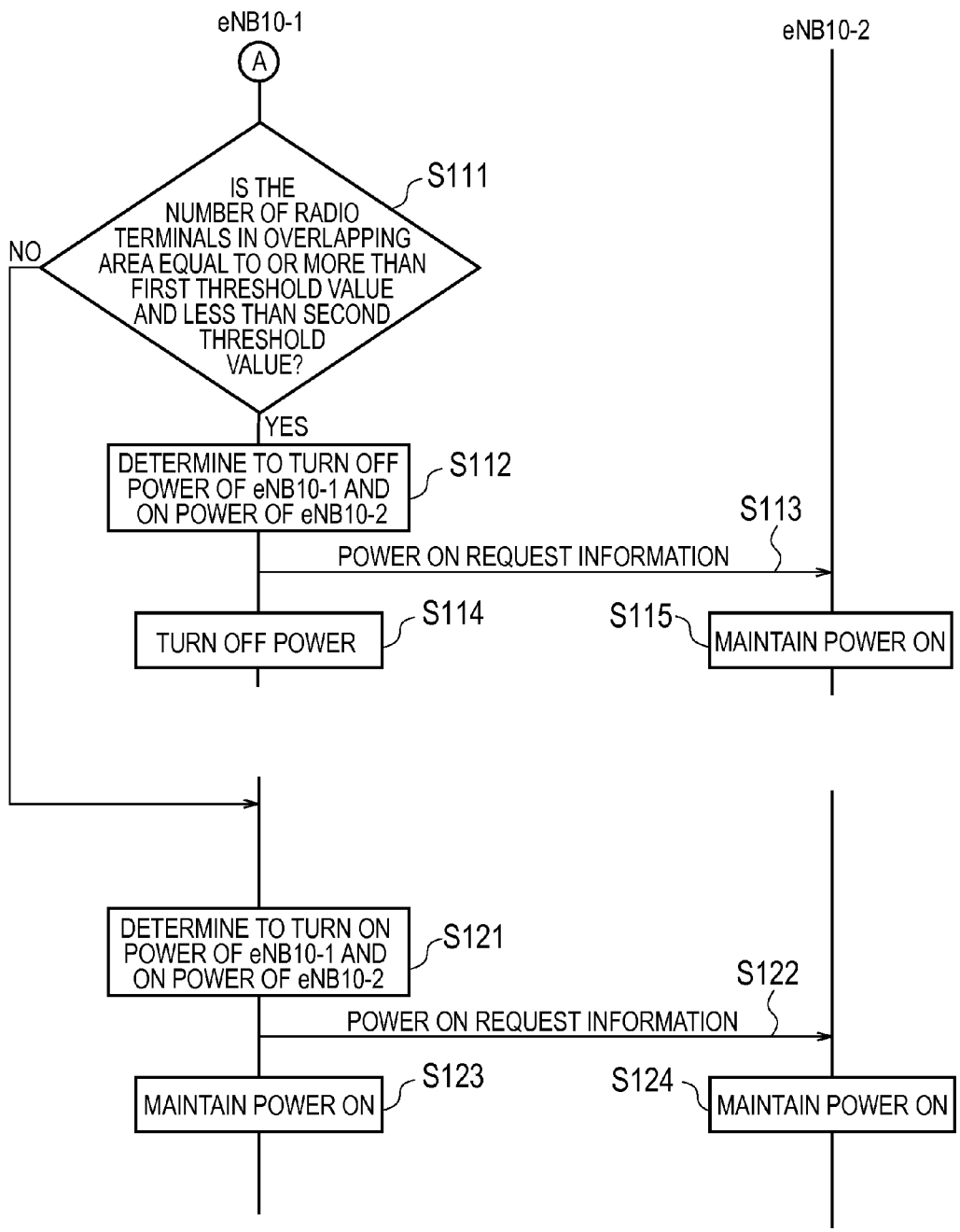
FIG. 5 is an operation sequence diagram illustrating a second operation of the radio communication system according to the embodiment of the present invention.

FIG. 4 and FIG. 5 are operation sequence diagrams illustrating the operation of the radio communication system 1 according to the present embodiment.

In step S101, the inside-overlapping-area-radio-terminal-number detection unit 121 of the radio base station eNB10-1 detects the number of the radio terminals UE30-1 which are connected to the radio base station eNB10-1 and exist in the overlapping area.

In step S102, the inside-overlapping-area-radio-terminal-number detection unit 121 of the radio base station eNB10-1 transmits the information message for requesting the number of the connected terminals in the overlapping area of other station for requesting the number of the radio terminals UE30-2, which are connected to the radio base station eNB10-2 and exist in the overlapping area, to the radio base station eNB10-2. The inside-overlapping-area-radio-terminal-number detection unit 121 of the radio base station eNB10-2 receives the information message for requesting the number of the connected terminals in the overlapping area of other station.

In step S103, the inside-overlapping-area-radio-terminal-number detection unit 121 of the radio base station eNB10-2 detects the number (the number of the connected terminals in the overlapping area of other station) of the radio terminals UE30-2 which are connected to the radio base station eNB10-2 and exist in the overlapping area.

In step S104, the inside-overlapping-area-radio-terminal-number detection unit 121 of the radio base station eNB10-2 transmits the information message of the number of the connected terminals in the overlapping area of other station to the radio base station eNB10-1. The inside-overlapping-area-radio-terminal-number detection unit 121 of the radio base station eNB10-1 receives the information message of the number of the connected terminals in the overlapping area of other station.

In step S105, the inside-overlapping-area-radio-terminal-number detection unit 121 of the radio base station eNB10-1 adds the number of the connected terminals in the overlapping area of its own station to the number of the connected terminals in the overlapping area of other station, and detects the number of radio terminals in the overlapping area.

In step S106, the power control unit 122 of the radio base station eNB10-1 determines whether the number of the radio terminals in the overlapping area is smaller than the first threshold value.

When the number of the radio terminals in the overlapping area is smaller than the first threshold value, the power control unit 122 of the radio base station eNB10-1 determines to turn on the power of the radio base station eNB10-1 and turn off the power of the radio base station eNB10-2 in step S107.

In step S108, the power control unit 122 of the radio base station eNB10-1 transmits the power-off request information message for requesting power-off to the radio base station eNB10-2. The power control unit 122 of the radio base station eNB10-2 receives the power-off request information message.

In step S109, the power control unit 122 of the radio base station eNB10-1 maintains the power-on of its own radio base station eNB10-1. In step S110, the power control unit 122 of the radio base station eNB10-2 performs control for turning off the power of its own radio base station eNB10-2.

Meanwhile, when the number of the radio terminals in the overlapping area is determined to be equal to or more than the first threshold value in step S106, the operation illustrated in FIG. 5 is performed, so that the power control unit 122 of the radio base station eNB10-1 determines whether the number of the radio terminals in the overlapping area is equal to or more than the first threshold value and is smaller than the second threshold value.

When the number of the radio terminals in the overlapping area is equal to or more than the first threshold value and is smaller than the second threshold value, the power control unit 122 of the radio base station eNB10-1 determines to turn off the power of the radio base station eNB10-1 and turn on the power of the radio base station eNB10-2 in step S112.

In step S113, the power control unit 122 of the radio base station eNB10-1 transmits the power-on request information message for requesting power-on to the radio base station eNB10-2. The power control unit 122 of the radio base station eNB10-2 receives the power-on request information message.

In step S109, the power control unit 122 of the radio base station eNB10-1 performs control for turning off the power of its own radio base station eNB10-1. In step S110, the power control unit 122 of the radio base station eNB10-2 maintains the power-on of its own radio base station eNB10-2.

Meanwhile, when the number of the radio terminals in the overlapping area is equal to or more than the first threshold value and is not smaller than the second threshold value in step S111, in other words, when the number of the radio terminals in the overlapping area is equal to or more than the second threshold value, the power control unit 122 of the radio base station eNB10-1 determines to turn on the power of the radio base station eNB10-1 and turn on the power of the radio base station eNB10-2 in step S121.

In step S122, the power control unit 122 of the radio base station eNB10-1 transmits the power-on request information message for requesting power-on to the radio base station eNB10-2. The power control unit 122 of the radio base station eNB10-2 receives the power-on request information message.

In step S123, the power control unit 122 of the radio base station eNB10-1 maintains the power-on of its own radio base station eNB10-1. In step S124, the power control unit 122 of the radio base station eNB10-2 maintains the power-on of its own radio base station eNB10-2.

(5) Operation and Effect

As described above, according to the present embodiment, the radio base station eNB10-1 detects the number of the radio terminals in an area where the cell C20-1 formed by the radio base station eNB10-1 overlaps the cell C20-2 formed by the radio base station eNB10-2 that is other station. Moreover, the radio base station eNB10-1 performs power control of the radio base station eNB10-1 and the radio base station eNB10-2 on the basis of the number of the radio terminals in the overlapping area.

That is, when the number of the radio terminals in the overlapping area is smaller than the first threshold value, the radio base station eNB10-1 performs control for turning on its own power and turning off the power of the radio base station eNB10-2 that is other station. Furthermore, when the number of the radio terminals in the overlapping area is equal to or more than the first threshold value and is smaller than the second threshold value, the radio base station eNB10-1 performs control for turning off its own power and turning on the power of the radio base station eNB10-2. Furthermore, when the number of the radio terminals in the overlapping area is equal to or more than the second threshold value, the radio base station eNB10-1 performs control for turning on both the power of the radio base station eNB10-1 and the power of the radio base station eNB10-2 that is other station.

Consequently, a radio base station eNB to be powered on is appropriately selected on the basis of the number of the radio terminals UE in the overlapping area, and efficient power control is possible is thereby enabled because it is possible to suppress power consumption of the radio communication system 1.

Furthermore, the radio base station eNB10-1 transmits a message of coordination information, which indicates that the radio base station eNB10-1 and the radio base station eNB10-2 coordinate with each other in relation to power control, to other radio base station eNB. In this way, the other radio base station eNB which received the coordination information is able to recognize that it is not possible to transmit a power control request to the radio base station eNB10-1 and the radio base station eNB10-2 because they coordinate with each other in relation to the power control, so that power control is prevented from being wastefully performed by the other radio base station eNB.

(6) Other Embodiments

Thus, the present invention has been described with the embodiment. However, it should not be understood that those descriptions and drawings constituting a part of the present disclosure limit the present invention. Further, various substitutions, examples, or operational techniques shall be apparent to a person skilled in the art on the basis of this disclosure.

In the aforementioned embodiment, the radio base station eNB10-1 controls the power of the radio base station eNB10-1 and the power of the radio base station eNB10-2. However, MME, which is an upper apparatus, may allow the radio base station eNB10-1 to control the power of the radio base station eNB10-1 and the power of the radio base station eNB10-2.

Figure 6:
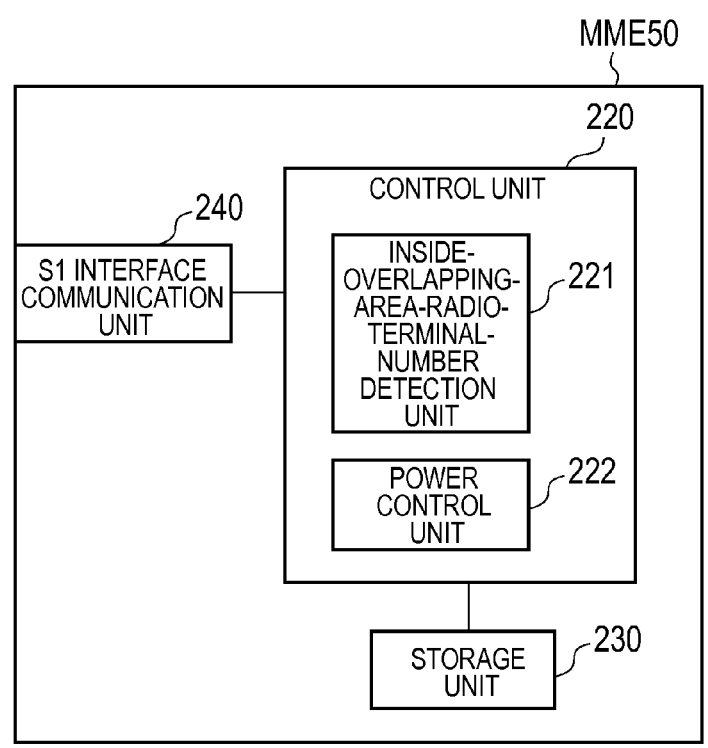
FIG. 6 is a block diagram illustrating a configuration of MME according to the embodiment of the present invention.

FIG. 6 is a block diagram illustrating a configuration of MME according to other embodiment.

As illustrated in FIG. 6, MME 50 includes a control unit 220, a storage unit 230, and an S1 interface communication unit 240. In addition, the radio base station eNB10-1 and the radio base station 10-2 include S1 interface communication units, respectively, in addition to the configuration illustrated in FIG. 3.

The control unit 220 includes an inside-overlapping-area-radio-terminal-number detection unit 221 and a power control unit 222.

The inside-overlapping-area-radio-terminal-number detection unit 221 transmits a message (hereinafter, referred to as an information message for requesting the number of connected terminals in the overlapping area) for requesting the number of radio terminals UE, which are connected to a corresponding radio base station eNB and exist in the overlapping area, to the radio base station eNB10-1 and the radio base station eNB10-2 through the S1 interface communication unit 240.

The inside-overlapping-area-radio-terminal-number detection units 121 of the radio base station eNB10-1 and the radio base station eNB10-2 detect the number of the radio terminals UE, which are connected to its own station and exist in the overlapping area, based on measurement reports. Moreover, the inside-overlapping-area-radio-terminal-number detection units 121 of the radio base station eNB10-1 and the radio base station eNB10-2 transmit a message of information on the number (hereinafter, referred to as the number of connected terminals in the overlapping area) of the radio terminals UE, which are connected to its own station and exist in the overlapping area, to the MME 50.

The inside-overlapping-area-radio-terminal-number detection unit 221 of the MME 50 receives the information message of the number of the connected terminals in the overlapping area from the radio base station eNB10-1, and the information message of the number of the connected terminals in the overlapping area from the radio base station eNB10-2 through the S1 interface communication unit 240. Next, inside-overlapping-area-radio-terminal-number detection unit 221 adds the number of the connected terminals in the overlapping area corresponding to the radio base station eNB10-1 to the number of the connected terminals in the overlapping area corresponding to the radio base station eNB10-2, and detects the number of the radio terminals in the overlapping area.

The power control unit 222 controls the power of the radio base station eNB10-1 and the power of the radio base station eNB10-2, which is other station, based on the number of the radio terminals in the overlapping area. Specifically, processes equal to the first to third processes in the aforementioned embodiment are performed.

That is, when the number of the radio terminals in the overlapping area is smaller than the first threshold value, the power control unit 222 determines to turn on the power of the radio base station eNB10-1 and turn off the power of the radio base station eNB10-2. In this case, the power control unit 222 transmits a power-on request information message for requesting power-on to the radio base station eNB10-1 and transmits a power-off request information message for requesting power-off to the radio base station eNB10-2 through the S1 interface communication unit 240.

Furthermore, when the number of the radio terminals in the overlapping area is equal to or more than the first threshold value and is smaller than the second threshold value, the power control unit 222 determines to turn off the power of the radio base station eNB10-1 and turn on the power of the radio base station eNB10-2. In this case, the power control unit 222 transmits the power-off request information message for requesting power-off to the radio base station eNB10-1 and transmits the power-on request information message for requesting power-on to the radio base station eNB10-2 through the S1 interface communication unit 240.

Furthermore, when the number of the radio terminals in the overlapping area is equal to or more than the second threshold value, the power control unit 222 determines to turn on both the power of the radio base station eNB10-1 and the power of the radio base station eNB10-2. In this case, the power control unit 222 transmits the power-on request information message for requesting power-on to the radio base station eNB10-1 and the radio base station eNB10-2 through the S1 interface communication unit 240.

When the power-on request information messages are received, the power control units 122 of the radio base station eNB10-1 and the radio base station eNB10-2 maintain an on-state of its own power, and when the power-off request information messages are received, the power control units 122 of the radio base station eNB10-1 and the radio base station eNB10-2 performs control for turning off its own power.

Furthermore, in the aforementioned embodiment, the radio base station eNB10-1 detects the number of the radio terminals UE in the overlapping area on the basis of the measurement reports. However, the radio base station eNB10-1 may acquire location information of the radio terminals UE from the MME or the radio terminals UE, determine whether the radio terminals exist in the overlapping area on the basis of the location information, and detect the number of the radio terminals UE in the overlapping area on the basis of the determination result.

Furthermore, in the aforementioned embodiment, the LTE system was described. However, the present invention may also be applied to other radio communication systems such as a radio communication system based on WiMAX (IEEE 802.16).

Moreover, as with the case in which a radio base station forming the cell C20-1 is a base station of the LTE system and a radio base station forming the cell C20-2 is a base station of a W-CDMA system, even when the cells formed by the base stations employing different radio communication scheme overlap each other, the present invention can be applied in the same manner.

Furthermore, the aforementioned embodiment was described on the assumption that the radio base station eNB10-1 corresponds to the first radio communication unit and the radio base station eNB10-2 corresponds to the second radio communication unit. However, the present invention can be applied in the same manner to a radio communication device including one control unit, a plurality of antennas, and a plurality of radio communication units.

Thus, it must be understood that the present invention includes various embodiments that are not described herein. Therefore, the present invention is limited only by the specific features of the invention in the scope of the claims reasonably evident from the disclosure above.

In addition, the entire content of Japanese Patent Application No. 2010-140006 (filed on Jun. 18, 2010) is incorporated in the present specification by reference.

INDUSTRIAL APPLICABILITY

According to the present invention, it is possible to provide a radio communication system, a radio base station, and a power control method, with which it is possible to perform efficient power control.

The invention claimed is:

1. A radio communication system including a first radio communication unit and a second radio communication unit, which have communication areas overlapping each other and have different numbers of radio terminals to be accommodated, comprising:
   a control unit that controls power of the first radio communication unit and power of the second radio communication unit, wherein
   the control unit performs control for turning on or off the power of the first radio communication unit and the power of the second radio communication unit on the basis of a number of radio terminals in an overlapping area corresponding to a range in which the communication areas overlap each other, and
   the first radio communication unit and the second radio communication unit exchange one or more information to determine the number of radio terminals in the overlapping area corresponding to the range in which the communication areas overlap each other.

2. The radio communication system according to claim 1, wherein,
   the control unit performs control for turning on only the power of the first radio communication unit when the number of radio terminals in the overlapping area is smaller than a first threshold value, and turning on only the power of the second radio communication unit when the number of radio terminals in the overlapping area is equal to or more than the first threshold value and is smaller than a second threshold value in a case where the number of radio terminals that can be accommodated by the first radio communication unit is smaller than the number of radio terminals that can be accommodated by the second radio communication unit.

3. The radio communication system according to claim 2, wherein
   frequencies of the first radio communication unit and the second radio communication unit, which are used for radio communication with the radio terminals, are different from each other, and the control unit performs control for turning on the power of the first radio communication unit and turning on the power of the second radio communication unit, when the number of radio terminals in the overlapping area is equal to or more than the second threshold value.

4. The radio communication system according to claim 1, wherein the control unit transmits coordination information, which indicates that the first radio communication unit and the second radio communication unit coordinate with each other in relation to power control, to other radio communication unit.

5. A radio base station, which has a communication area overlapping a communication area of other radio base station and has a number of radio terminals to be accommodated different from a number of radio terminals to be accommodated of the other radio base station, comprising:

a control unit configured to control power of the radio base station, wherein the control unit performs control for turning on or off the power on the basis of a number of radio terminals in an overlapping area corresponding to a range in which the communication areas overlap each other, and the radio base station and the other radio base station exchange one or more information to determine the number of radio terminals in the overlapping area corresponding to the range in which the communication areas overlap each other.

6. A power control method in a radio communication system including a first radio communication unit, a second radio communication unit, and a control unit, the first radio communication unit and the second radio communication unit having communication areas overlapping each other and having different numbers of radio terminals to be accommodated, comprising the steps of:

controlling, by the control unit, power of the first radio communication unit and power of the second radio communication unit, wherein in the step of controlling the power, the power of the first radio communication unit and the power of the second radio communication unit are controlled to be turned on or off on the basis of a number of radio terminals in an overlapping area corresponding to a range in which the communication areas overlap each other, and the first radio communication unit and the second radio communication unit exchange one or more information to determine the number of radio terminals in the overlapping area corresponding to the range in which the communication areas overlap each other.

* * * * *